United States Patent [19]
Johnson

[11] 3,717,362
[45] Feb. 20, 1973

[54] ADJUSTABLE AND RETRACTABLE TRAILER HITCH

[76] Inventor: Thomas C. Johnson, 1009 Henderson Street, Houston, Tex. 77027

[22] Filed: May 18, 1971

[21] Appl. No.: 144,586

[52] U.S. Cl. ........280/415 A, 280/491 A, 280/164 R, 280/500, 293/69
[51] Int. Cl. ................................................B60d 1/06
[58] Field of Search....280/482, 491 A, 491 E, 415 A

[56] References Cited

UNITED STATES PATENTS

| | | | |
|---|---|---|---|
| 2,838,327 | 6/1958 | Collins | 280/491 A |
| 2,544,185 | 3/1951 | Sargent | 280/491 A |
| 2,671,674 | 3/1954 | Derksen | 280/491 A |
| 2,804,316 | 8/1957 | Derksen | 280/491 A |
| 2,872,213 | 2/1959 | Hosford | 280/415 A |
| 2,474,231 | 6/1949 | Crosley | 280/491 A |

FOREIGN PATENTS OR APPLICATIONS

| | | | |
|---|---|---|---|
| 947,675 | 8/1956 | Germany | 280/491 A |
| 645,022 | 7/1964 | Belgium | 280/491 A |

*Primary Examiner*—Leo Friaglia
*Attorney*—Jack W. Hayden

[57] ABSTRACT

A trailer hitch for a vehicle comprises a housing and a shaft member which are telescopically positioned relative to each other. A single or multiple ball trailer hitch is provided on the side or sides of the shaft adjacent its end, and cooperating means on the shaft and housing are provided for positioning them at longitudinally predetermined, spaced relationships, as well as permitting the ball trailer hitch to be positioned in any one of several rotated planes or in retracted position when not in use. Where a multiple ball trailer hitch is provided, the balls may be of different diameter.

2 Claims, 5 Drawing Figures

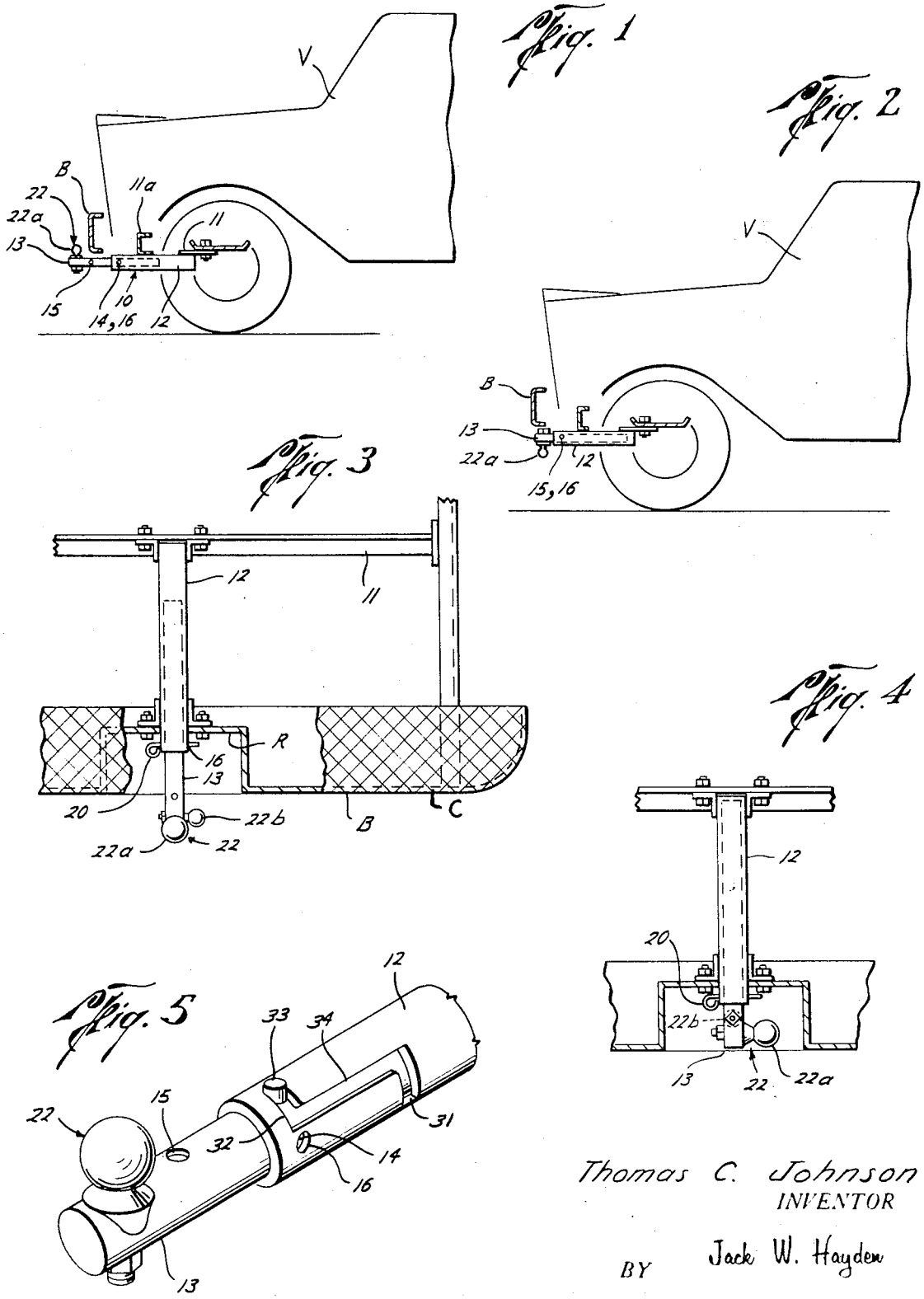

ADJUSTABLE AND RETRACTABLE TRAILER HITCH

BACKGROUND OF THE INVENTION

Various trailer hitches for vehicles have been provided and used in the past of the ball type which are adapted to be secured to the frame and extend beyond the bumper of a vehicle.

SUMMARY OF THE INVENTION

In some instances it is desirable to place the ball in either an upwardly facing position or a downwardly facing position or a sidewardly facing position, as well as being able to retract it so that it does not protrude or project beyond the bumper of the vehicle. Also, it is sometimes desirable to have ball hitches of several different diameters for fitting with the proper size conforming part of the trailer tongue.

An object of the present invention is to provide a relatively simple trailer hitch for a vehicle which may include single or multiple ball hitches of different diameter and which enables the ball trailer hitch to be positioned either in up, down, or a sideward position relative to the vehicle bumper, as well as enabling the ball trailer hitch to be retracted when desired.

Still another object of the present invention is to provide a hollow housing and a shaft telescopically fitting within the housing with a ball trailer hitch means on the shaft adjacent its end and means on the housing and shaft for accommodating relative longitudinal movement between the shaft and housing as well as positioning the shaft and housing in any one of several longitudinal and angular relationships.

Other objects and advantages of the present invention will become more apparent from a consideration of the present description and drawings.

BRIEF DESCRIPTION OF THE DRAWINGS

FIG. 1 is a side view, partly in section, illustrating one form of the present invention wherein the ball trailer hitch is positioned to face upwardly relative to the vehicle bumper;

FIG. 2 illustrates a form of the invention shown in FIG. 1 with the ball trailer hitch retracted to a position so that it does not project or protrude beyond the vehicle bumper when not in use;

FIG. 3 is a plan view, partly in section, illustrating another form of vehicle bumper with the form of the invention shown in FIGS. 1 and 2 secured to the frame of the vehicle;

FIG. 4 illustrates the trailer hitch of the present invention in retracted position in the form of bumper illustrated in FIG. 3; and OF FIG. 5 illustrates another form of the invention with alternate means for positioning the shaft and housing longitudinally relative to each other and retaining them in a predetermined longitudinally fixed position.

DESCRIPTION O THE PREFERRED EMBODIMENT

In FIG. 1, a front portion of a vehicle is represented by the letter V, and the front bumper by the letter B. The present invention is referred to generally by the numeral 10 and is shown as having a portion secured to the frame of the vehicle represented at 11 and 11a. The present invention includes a hollow elongated housing 12 with a shaft 13 telescopically received therein. A plurality of longitudinally spaced openings as illustrated at 14 and 15 is provided in the shaft means, and an opening 16 is provided in the housing 12 for mating with any one of the openings as illustrated at 14 and 15 so that the shaft and housing can be positioned at a plurality of longitudinally and angularly spaced, telescoped positions.

In FIG. 3, suitable means such as a pin 20 is provided for fitting through the opening 16 in the housing and any one of the openings which are mated therewith in the shaft for locking the shaft and housing in such predetermined longitudinal and angular relationship.

As illustrated in FIG. 1 of the drawings, the shaft 13 is shown as being extended beyond the bumper B, and the ball trailer hitch means 22 that is formed adjacent one end of the shaft 13 is illustrated as having a single ball 22a projecting upwardly for engagement with the tongue of a trailer.

In FIGS. 1, 2, 3, and 4, the housing 12 and the shaft 13 are shown as being of noncircular, quadrilateral hollow configuration. FIGS. 1 and 2 show the ball hitch means 22 with a single ball 22a. In FIGS. 3 and 4, the ball hitch means 22 includes balls 22a and 22b. In order to move the ball 22a of the FIGS. 1 and 2 form to an inoperative position and retract it relative to the bumper to inhibit damage to such ball trailer hitch, or damage to a vehicle or other object with which it might come in contact, it may be moved to the position illustrated in FIG. 2 of the drawings. This is accomplished by withdrawing the shaft 13 from the housing 12 and rotating it so that the ball 22 projects downwardly, whereupon the shaft is then inserted within the housing 12 and an opening in the shaft 13 aligned with the opening 16 in the housing, whereupon the pin means as illustrated at 20 may again be reinserted.

In FIG. 3 of the drawings, the bumper B is illustrated as being of a different configuration in that it is provided with a recess R. The trailer hitch of the present invention is again shown as being secured to the vehicle frame 11, and including a housing 12 and a shaft 13 with the ball hitch 22 formed on the end thereof.

When it is desired to retract the trailer hitch 22 of the FIGS. 3 and 4 form to an operative position, the shaft 13 may be withdrawn from the housing 12 as previously described, and the shaft 13 is then rotated and then reinserted in the noncircular housing 12 so that the balls 22a and 22b project sidewardly and downwardly as illustrated in FIG. 4. When the holes 14 or 15 in the shaft 13 are aligned with holes 16 in housing 12, the pin 20 is inserted therethrough and the ball hitch 22 is retained in its retracted position. In FIGS. 3 and 4, the bumper B is covered by the cover C which also covers the recess R so as to provide a step. Although the bumper B is shown as being on the front of the vehicle, it may also be on the rear.

In FIG. 5, an alternate embodiment is illustrated wherein the housing 12 is formed of circular hollow tubing, and the shaft 13 is formed of circular rod or hollow tubing which telescopically fits within the circular housing 12. A slot 30 is formed in the circular housing 12, such slot having a longitudinally extending portion 34 with at least two sidewardly extending portions 31 and 32 as shown. Other sidewardly or laterally extending projections between the end projections 31 and 32 may be provided, if desired, so that the pin 33 formed on the shaft 13 may be moved to the laterally extending portions of the slot 30 which thereby positions the housing 12 and shaft 13 in various predetermined longitudinal relationships. The longitudinally extending portion 34 connects the two laterally extending slots 31 and 32 to accommodate movement of the pin 33 to either the laterally extending portion 31 or the laterally extending portion 32. When the pin 33 is in the laterally extending slot 32 as shown, the ball 22 on the end of shaft 13 is in an upward position; however, when the shaft 13 is rotated and the pin 33 moved along slot 34 to the oppositely laterally extending slot 31, the ball 22 then extends sidewardly to enable the hitch to assume the position shown in FIG. 4 of the drawings. When the holes in the shaft 13 and housing 12 are aligned, the pin 20 is inserted and the ball hitch 20 is retained in its retracted position.

The form of the invention shown in FIG. 5 may be employed with a vehicle having a bumper B of the form shown in either FIG. 1 or FIG. 3. In such event, in the FIG. 1 vehicle bumper, the ball hitch 22 would extend sidewardly rather than downwardly as illustrated.

The foregoing disclosure and description of the invention are illustrative and explanatory thereof, and various changes in the size, shape, and materials as well as in the details of the illustrated construction may be made without departing from the spirit of the invention.

What is claimed is:
1. A trailer hitch arrangement including:
   a. hollow elongated, non-circular housing means;
   b. support means for said housing means including a vehicle bumper having a recess therein into which said housing means extends;
   c. shaft means telescopically received in said housing means;
   d. ball hitch means supported adjacent one end of said shaft means, said ball hitch means including at least a pair of ball means each of which is of a different size; and
   e. locking means cooperable with said hollow housing means and shaft means to retain said shaft and ball hitch means retracted in the bumper recess and to lock said shaft means extended relative to said housing means to position said ball hitch means for use.

2. The invention of claim 1 wherein said locking means includes a plurality of holes at spaced longitudinal intervals in said shaft means with an opening in said housing for mating with any one of said openings in said shaft, and means for fitting through said housing and shaft holes for securing said shaft means and housing in a predetermined longitudinal and angular relationship.

* * * * *